US010015395B2

(12) United States Patent
Fujimori

(10) Patent No.: US 10,015,395 B2
(45) Date of Patent: Jul. 3, 2018

(54) COMMUNICATION SYSTEM, COMMUNICATION APPARATUS, COMMUNICATION METHOD AND PROGRAM

(71) Applicant: CANON KABUSHIKI KAISHA, Tokyo (JP)

(72) Inventor: Yuki Fujimori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 14 days.

(21) Appl. No.: 15/204,346

(22) Filed: Jul. 7, 2016

(65) Prior Publication Data

US 2017/0013206 A1  Jan. 12, 2017

(30) Foreign Application Priority Data

Jul. 9, 2015  (JP) ................................. 2015-138114

(51) Int. Cl.
*H04N 5/232* (2006.01)

(52) U.S. Cl.
CPC .............................. *H04N 5/23229* (2013.01)

(58) Field of Classification Search
CPC ........... H04N 5/23203; H04N 5/23206; H04N 1/00204–1/00244; H04N 7/14–7/157; H04N 7/183–7/186
See application file for complete search history.

(56) References Cited

U.S. PATENT DOCUMENTS

| 8,520,734 B1* | 8/2013 | Xu ...................... H04N 19/105 375/240.02 |
| 2002/0021353 A1* | 2/2002 | DeNies ............ H04N 21/21805 348/36 |
| 2007/0035615 A1* | 2/2007 | Kung ..................... H04N 5/232 348/14.08 |
| 2011/0276652 A1* | 11/2011 | Mukherjee ........... H04N 19/164 709/217 |
| 2012/0147954 A1* | 6/2012 | Kasai ................. H04N 21/2343 375/240.03 |
| 2016/0277661 A1* | 9/2016 | Brav .................. H04N 5/23206 |

FOREIGN PATENT DOCUMENTS

JP  5544426 B2  7/2014

* cited by examiner

*Primary Examiner* — Paul Berardesca
(74) *Attorney, Agent, or Firm* — Canon USA, Inc. I.P. Division

(57) ABSTRACT

A communication apparatus includes: a specifying unit configured to specify a region in an image; a determination unit configured to determine a mode used for communication of image data from a plurality of modes including a first mode for communicating image data of a region of interest specified by the specifying unit, and a second mode for communicating, in addition to the image data of the region of interest, image data of a region of no interest which has not been specified by the specifying unit; and a communication unit configured to communicate image data with other communication apparatus in accordance with a mode determined by the determination unit.

12 Claims, 7 Drawing Sheets

COMMUNICATION SYSTEM, COMMUNICATION APPARATUS, COMMUNICATION METHOD AND PROGRAM

BACKGROUND OF THE INVENTION

Field of the Invention

The present invention relates to communication technology for performing communication of image data.

Description of the Related Art

A method has been known in which only a part of an overall region of a video captured by an image capturing apparatus is transmitted. JP 5544426 B2 discloses that a server 1 specifies a viewing region Av in an overall region Aw based on viewpoint movement information acquired from a client 2, and transmits a viewing region video corresponding to the viewing region Av to the client 2. By doing the above procedure, the client 2 can display the viewing region Av on a display screen.

However, there has been a risk that image data corresponding to an image to be displayed on a display screen is not transmitted.

For example, there may be a case where a user desires display of not only an image of a region of interest (ROI) in an overall region but also an image of a region surrounding the region of interest. When only image data of the region of interest is transmitted from other communication apparatus in such a case, the image of the surrounding region cannot be displayed.

In addition, for example, there may be a case where when a region of interest in an overall region in a moving image is being displayed on a display screen, a user performs an operation to change the region of interest to be displayed on the display screen. When only an image of the region of interest before change has been acquired in such a case, an image to be displayed and an image acquired from other apparatus do not match each other. If a user performs an operation to change a region of interest and then performs a process for acquiring a moving image of the changed region of interest, there may be a possibility that it takes some time to start displaying the moving image of the changed region of interest.

On the other hand, when employing a method in which image data corresponding to an overall region is always transmitted, or a method in which image data corresponding to a surrounding region is always transmitted, a load in proportion to a communication data amount is increased. Examples of the load in proportion to a communication data amount include a load on transmission of image data by a transmitting apparatus, a load on reception or a decoding process of image data by a receiving apparatus, and a load on a communication network.

SUMMARY OF THE INVENTION

A communication apparatus includes: a specifying unit configured to specify a region in an image; a determination unit configured to determine a mode used for communication of image data from a plurality of modes including a first mode for communicating image data of a region of interest specified by the specifying unit, and a second mode for communicating, in addition to the image data of the region of interest, image data of a region of no interest which has not been specified by the specifying unit; and a communication unit configured to communicate image data with other communication apparatus in accordance with a mode determined by the determination unit.

Further features of the present invention will become apparent from the following description of exemplary embodiments (with reference to the attached drawings).

DESCRIPTION OF THE EMBODIMENTS

Hereinbelow, an embodiment will be described in detail with reference to the accompanied drawings. A configuration illustrated in the following embodiment is by way of example only, and the present invention is not limited to the following configuration.

Figure 1:
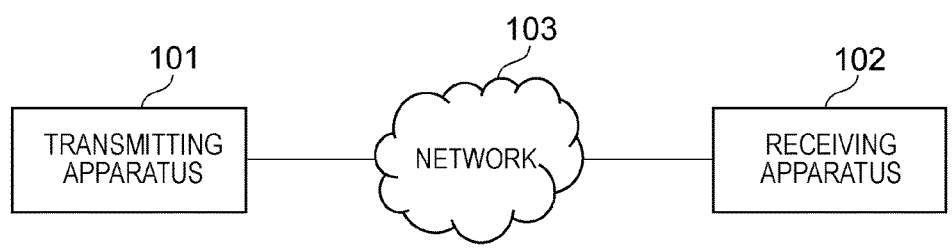
FIG. 1 is a diagram for explaining a system configuration of an embodiment.

FIG. 1 illustrates an example of a communication system as a whole in the embodiment. As illustrated in FIG. 1, a transmitting apparatus 101 is connected to a receiving apparatus 102 through a network 103. There may be a plurality of the transmitting apparatuses 101 and a plurality of the receiving apparatuses 102.

Specific examples of the transmitting apparatus 101 include a camera apparatus, a video camera apparatus, a smartphone apparatus, a PC apparatus, and a mobile phone. However, there is no limitation thereto as long as a functional configuration described below is fulfilled.

Specific examples of the receiving apparatus 102 include a smartphone apparatus, a PC apparatus, a television set, and a mobile phone. However, there is no limitation thereto as long as it is provided with a function described below.

The network 103 is a wired local area network (LAN) or a wireless LAN as a home network in the embodiment. In the embodiment, an example in which a wired LAN or a wireless LAN is used as a home network is assumed and described. However, there is no limitation thereto, and the network 103 may be a wide area network (WAN), Bluetooth (registered trademark), ZigBee (registered trademark), or the like. In the embodiment, a description will be focused on an example in which moving image data is transmitted to the receiving apparatus 102 from the transmitting apparatus 101. However, still image data may be transmitted instead of the moving image data. In the embodiment, a description will be given based on an assumption that a concept of image data includes both concepts of moving image data and still image data, unless otherwise specified.

Figure 7:
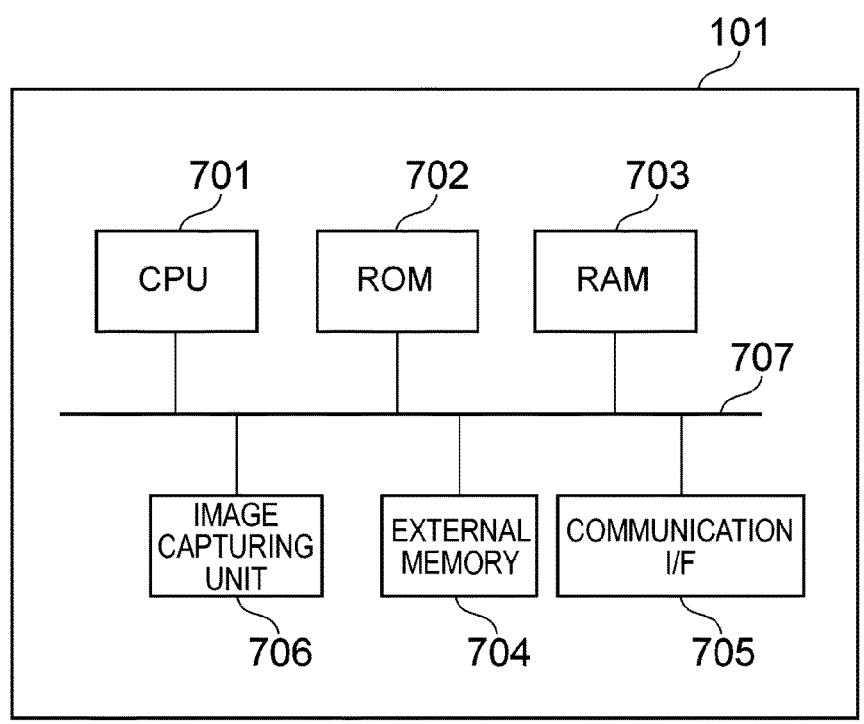
FIG. 7 is a block diagram illustrating an example of a hardware configuration of the transmitting apparatus 101 and the receiving apparatus 102.

FIG. 7 is a diagram illustrating an example of a hardware configuration of the transmitting apparatus 101 according to the embodiment. The transmitting apparatus 101 includes a CPU 701, a ROM 702, a RAM 703, an external memory 704, a communication I/F 705, an image capturing unit 706, and a system bus 707.

The CPU 701 performs overall control of operations in the transmitting apparatus 101, and controls each of constitutional units (702 to 706) through the system bus 707.

The ROM 702 is a non-volatile memory for storing a control program and the like necessary for the CPU 701 to execute processing. The program may be stored in the external memory 704 or a detachable storage medium.

The RAM 703 functions as a main memory, a work area, and the like, of the CPU 701. In other words, when executing processing, the CPU 701 loads a necessary program and the like on the RAM 703 from the ROM 702, and executes the program and the like, thereby realizing various functional operations of the transmitting apparatus 101 described below.

The external memory 704 stores, for example, various data and a variety of information necessary for the CPU 701 to execute processing with a program. The external memory 704 stores, for example, various data and a variety of information acquired by the CPU 701 executing processing with a program and the like.

The communication I/F 705 is an interface for communication with an external apparatus (in the embodiment, the receiving apparatus 102). The communication I/F 705 is, for example, a LAN interface.

The image capturing unit 706 includes a solid-state image capturing element such as a CMOS sensor and a CCD sensor, and can capture a still image and a moving image based on the control of the CPU 701.

The system bus 707 communicably connects the CPU 701, the ROM 702, the RAM 703, the external memory 704, the communication I/F 705, and the image capturing unit 706.

In the embodiment, a description will be given based on an assumption that the receiving apparatus 102 has the same hardware configuration as that of the transmitting apparatus 101. However, a part of the hardware configuration may be different between the transmitting apparatus 101 and the receiving apparatus 102, and the configuration is not limited to that illustrated in FIG. 7.

Figure 2:
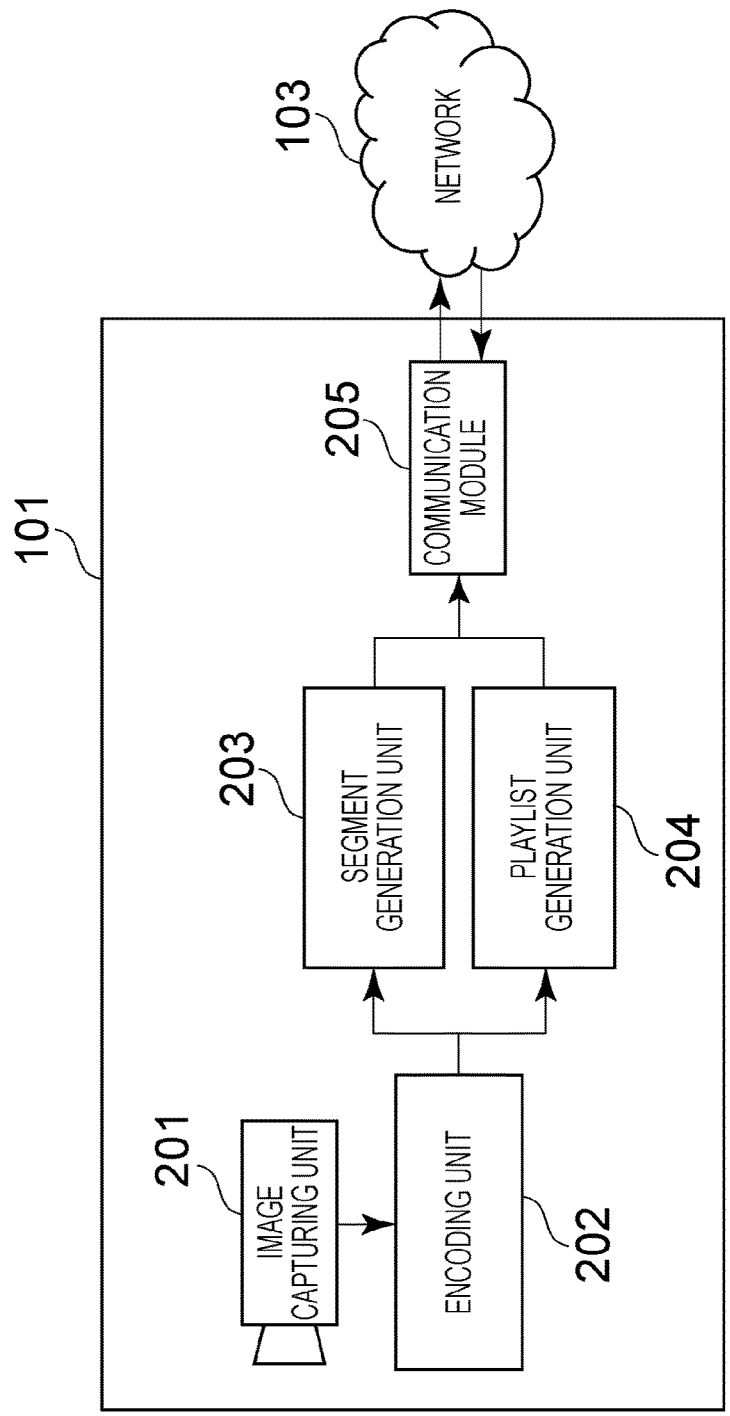
FIG. 2 is a block diagram illustrating an example of a functional configuration of a transmitting apparatus 101 in the embodiment.

FIG. 2 illustrates an example of a functional configuration of the transmitting apparatus 101 in the embodiment. As illustrated in FIG. 2, the transmitting apparatus 101 in the embodiment includes an image capturing unit 201, an encoding unit 202, a segment generation unit 203, a playlist generation unit 204, and a communication module 205. In the embodiment, a description will be focused on an example in which the transmitting apparatus 101 includes the image capturing unit 201 and the encoding unit 202. However, the image capturing unit 201 and the encoding unit 202 may not be necessarily included. The transmitting apparatus 101 can acquire encoded image data from an external apparatus in addition to image data acquired by the image capturing unit 201, or instead of image data acquired by the image capturing unit 201.

The encoding unit 202 of the transmitting apparatus 101 encodes image data acquired by image capturing by the image capturing unit 201. The encoding unit 202 of the embodiment encodes a region equivalent to one image frame (an overall region) for each of multiple divided regions (tiles). When the transmitting apparatus 101 can acquire image data divided for each of divided regions from an external apparatus, the image capturing unit 201 and the encoding unit 202 may not be included. As a coding method, a standard technique such as high efficiency video coding (HEVC) can be used with which encoding can be performed for each of divided regions. The encoding unit 202 of the embodiment can execute encoding based on a scalable coding system, which will be described in detail later.

The segment generation unit 203 generates a segment from image data encoded by the encoding unit 202. The segment generation unit 203 of the embodiment generates a segment by performing time division of the image data for every two seconds. In the embodiment, the segment is a unit of transmission of image data transmitted from the transmitting apparatus 101 to the receiving apparatus 102. In other words, the receiving apparatus 102 requests image data to the transmitting apparatus 101 by the segment, and the transmitting apparatus 101 transmits the image data by the segment in response to the request from the receiving apparatus 102. In the embodiment, a description will be given for a case where International Organization for Standardization base media file format (ISOBMFF) is used as a file format of the segment. However, there is no limitation thereto. For example, MPEG-2 transport stream (TS) may be used as other file format.

The playlist generation unit 204 generates a playlist which includes a URL used by the receiving apparatus 102 for requesting a segment generated by the segment generation unit 203. In the embodiment, a description will be focused on an example in which an MPD, which is defined in MPEG-dynamic adaptive streaming over HTTP (DASH), is used as a format of the playlist. The MPD is an abbreviation for media presentation description. However, there is no limitation thereto, and a playlist in accordance with HTTP live streaming and the like may be used. The MPD (playlist) includes region information indicating that which divided region corresponds to which position in the overall region, and a URL for acquisition of image data corresponding to the divided region.

The communication module 205 provides an MPD (playlist) generated by the playlist generation unit 204 to the receiving apparatus 102. The communication module 205 may provide the MPD in response to a request for the MPD from the receiving apparatus 102, or may provide the latest MPD to the receiving apparatus 102 at predetermined time intervals. Timing for transmitting the MPD is not particularly limited. In addition, in response to a request for a segment from the receiving apparatus 102 which has acquired the MPD, the communication module 205 transmits the segment. In the request for a segment in the embodiment, a URL for acquisition is included. The communication module 205 of the transmitting apparatus 101 transmits segment data (image data) corresponding to the URL for acquisition to the receiving apparatus 102.

Figure 3:
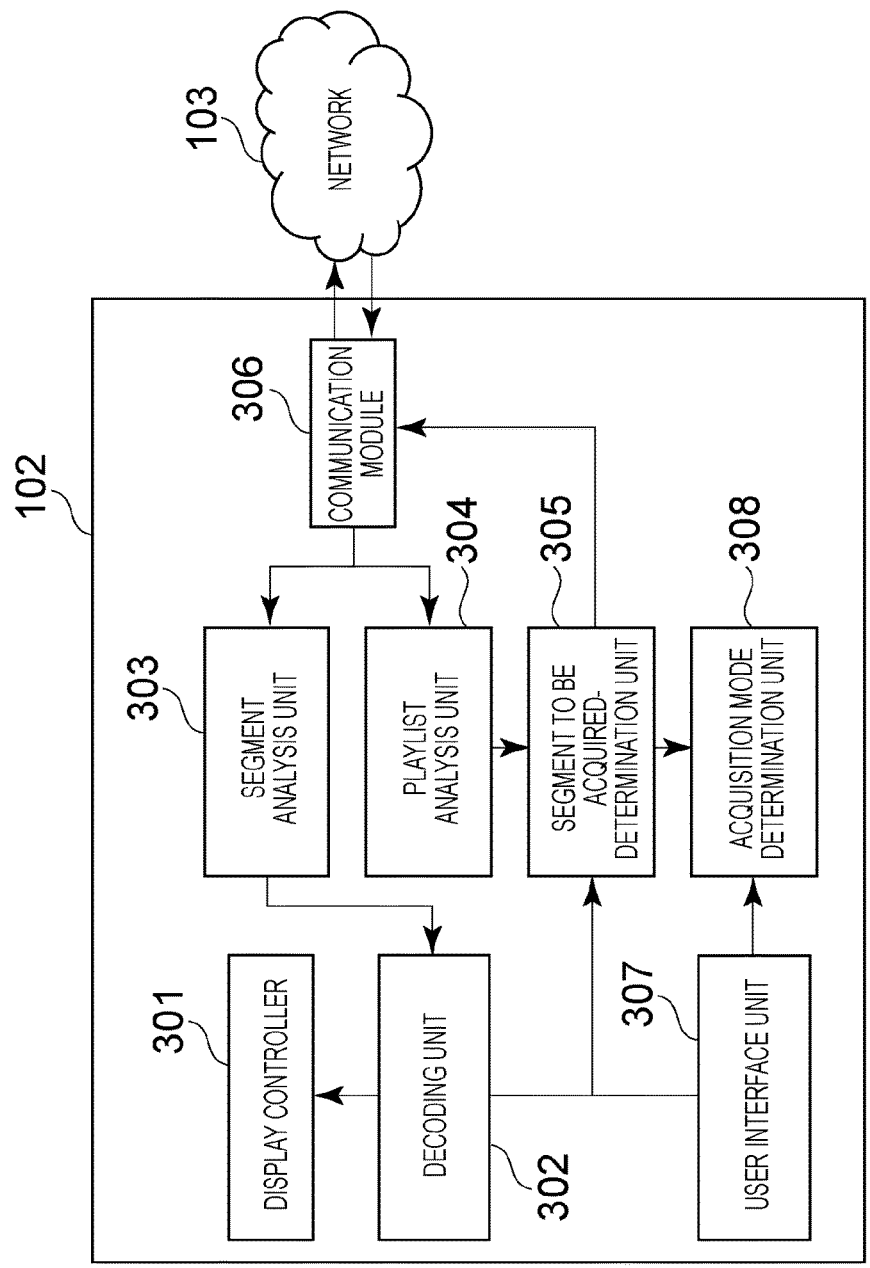
FIG. 3 is a block diagram illustrating an example of a functional configuration of a receiving apparatus 102 in the embodiment.

Next, a functional configuration of the receiving apparatus 102 will be described. FIG. 3 is a block diagram for explaining the functional configuration of the receiving apparatus 102 in the embodiment. As illustrated in FIG. 3, the receiving apparatus 102 includes a display controller 301, a decoding unit 302, a segment analysis unit 303, a playlist analysis unit 304, a segment to be acquired-determination unit 305, a communication module 306, a user interface unit 307, and an acquisition mode determination unit 308.

The communication module 306 of the receiving apparatus 102 requests an MPD (playlist) to the transmitting apparatus 101 through the network 103, and receives the MPD transmitted as a response to the request. The MPD received by the communication module 306 is provided to the playlist analysis unit 304 and analyzed therein. The playlist analysis unit 304 provides information including a URL for acquisition of each segment described in the MPD, and time information and spatial information corresponding to the segment, which are correlated with each other, to the segment to be acquired-determination unit 305 as an analysis result of the MPD.

The segment to be acquired-determination unit 305 determines a segment to be acquired and acquisition timing thereof. Specifically, the segment to be acquired-determination unit 305 acquires information regarding a position of a region of interest (ROI) input through the user interface unit 307 and specifies the position of the region of interest with respect to an overall region. The segment to be acquired-determination unit 305 acquires identification information of an acquisition mode determined by the acquisition mode determination unit 308 based on the information input through the user interface unit 307. In the embodiment, the acquisition mode includes at least a first mode and a second mode. In the first mode, image data of the region of interest (ROI) among the overall region is communicated. In the second mode, in addition to the image data of the region of interest, image data of a region of no interest is communicated. The image data of the region of no interest communicated in the second mode is image data of a region surrounding the region of interest. However, the number of the modes is not limited to the above two. For example, there may be the first mode in which only image data of the region of interest is communicated, the second mode in which in addition to the image data of the region of interest, image data of a divided region adjacent to the region of interest is communicated, and a third mode in which image data of a surrounding region larger than that in the second mode is also communicated.

In the above, an example has been described in which both the region of interest (ROI) and the acquisition mode are determined based on input from the user interface unit 307. However, there is no limitation to the above example. In other words, the segment to be acquired-determination unit 305 can determine the acquisition mode based on at least any of the user operation, communication status of the network 103, and load status of the transmitting apparatus 101. The network 103 is a network through which the transmitting apparatus 101 (communication apparatus) and the receiving apparatus 102 (other communication apparatus) are connected.

The segment to be acquired-determination unit 305 specifies a URL for acquisition corresponding to image data to be requested to the transmitting apparatus 101 with the use of information of the acquisition mode as determined above, information of the region of interest, and the analysis result of the MPD acquired from the playlist analysis unit 304.

The segment to be acquired-determination unit 305 determines acquisition timing in consideration of a remaining reproduction time of image data accumulated in the decoding unit 302. In other words, the segment to be acquired-determination unit 305 determines timing for transmitting a request for image data to the transmitting apparatus 101 based on a reproduction time corresponding to image data which is not reproduced in the display controller 301 among the received image data from the transmitting apparatus 101.

In the embodiment, a description will be focused on an example in which a touch panel is used as the user interface unit 307. However, there is no limitation thereto, and a mouse, a keyboard, or a voice input apparatus may be used. As a method for determining an acquisition mode using a touch panel, there is a method in which a button for switching the acquisition mode is displayed on the touch panel in order for a user to perform an operation. Alternatively, another method may be adopted which employs, as an acquisition mode, a mode in which until a predetermined period of time has elapsed after detecting a touch or swipe operation to a touch panel, image data of a surrounding region is communicated in addition to image data of a region of interest.

The user interface unit 307 of the receiving apparatus 102 in the embodiment can accept a user operation to change a region of interest when the display controller 301 is displaying an image based on image data corresponding to the region of interest on a display screen. The display controller 301 executes processing for changing the region of interest in response to the user operation in a case where the second mode is employed when the user operation has been accepted. On the other hand, the display controller 301 does not execute processing for changing the region of interest in accordance with the user operation in a case where the first mode is employed when the user operation has been accepted.

The communication module 306 requests, to the transmitting apparatus 101, a segment to be acquired which has been determined by the segment to be acquired-determination unit 305 through the network 103, and receives a segment transmitted from the transmitting apparatus 101 as a response to the request. In other words, the communication module 306 receives, from the transmitting apparatus 101, a segment (image data) according to the acquisition mode determined by the acquisition mode determination unit 308. The segment analysis unit 303 analyzes the segment received from the transmitting apparatus 101 to extract image data. The extracted image data is decoded by the decoding unit 302. Then, an image corresponding to the decoded image data is displayed on the display screen by the display controller 301.

Figure 4:
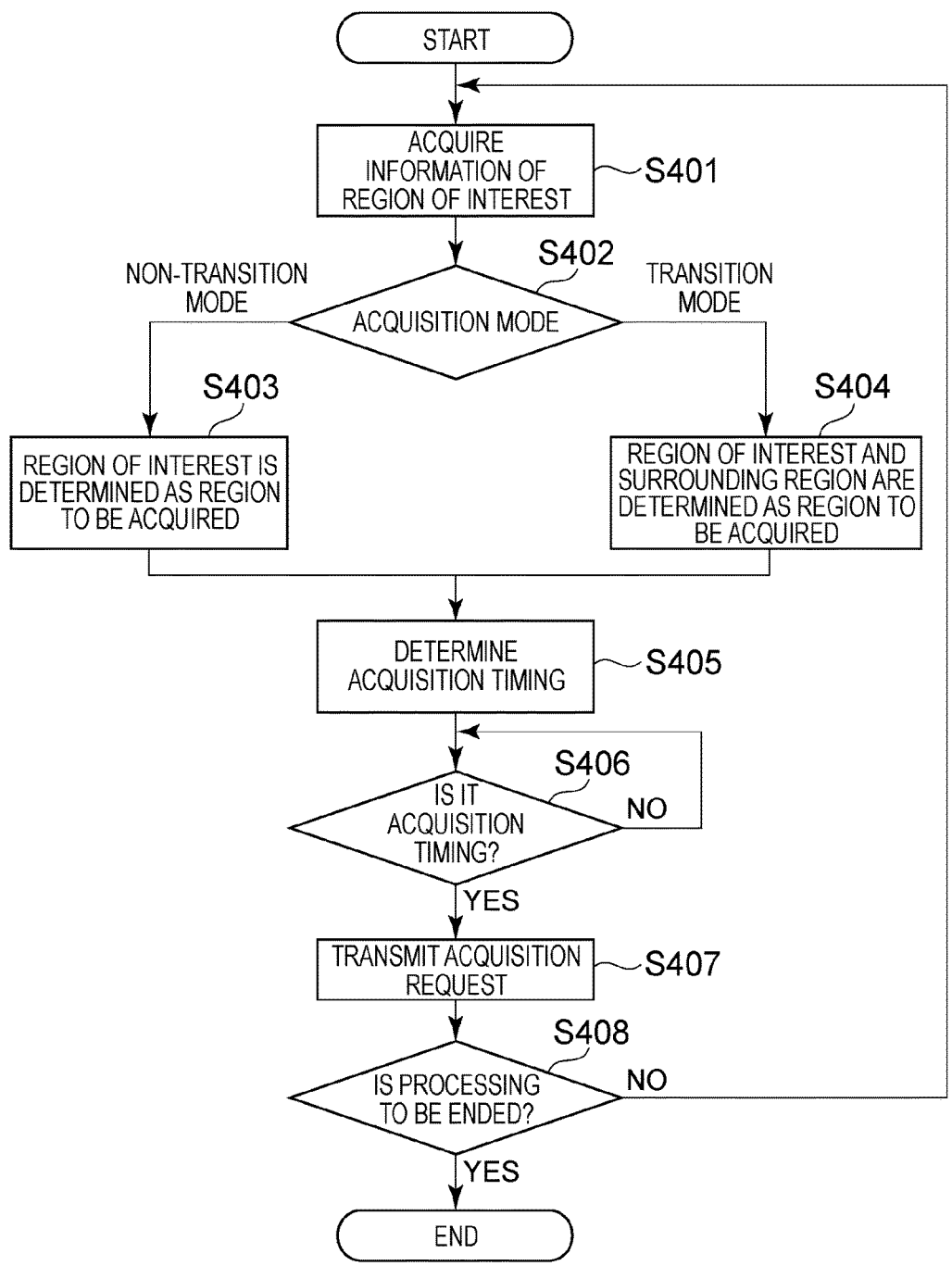
FIG. 4 is a flowchart for explaining an operation of the transmitting apparatus 101 and the receiving apparatus 102 in the embodiment.

Next, an operation of the receiving apparatus 102 according to the embodiment will be described. FIG. 4 is a flowchart for explaining the operation of the receiving apparatus 102. The receiving apparatus 102 according to the embodiment executes processing described with reference to FIG. 4 through the CPU 701 illustrated in FIG. 7 executing a necessary program. The processing illustrated in FIG. 4 is started at timing when an instruction to start an image streaming service has been input through the user interface unit 307. However, the timing for start the processing illustrated in FIG. 4 is not limited to the above timing.

In S401, the segment to be acquired-determination unit 305 specifies a region of interest (ROI). The region of interest (ROI) is a partial region in a region equivalent to one frame image (an overall region) acquired by image capturing by the image capturing unit 201. In other words, the segment to be acquired-determination unit 305 specifies a region in an image in S401.

In S402, the segment to be acquired-determination unit 305 determines whether the acquisition mode determined by the acquisition mode determination unit 308 is a non-transition mode (first mode) or a transition mode (second mode). The first mode is a mode for communicating image data of the region of interest, and the second mode is a mode for communicating image data of a region of no interest (surrounding region) in addition to the image data of the region of interest. In the embodiment, the description has been given for the example in which there are the first mode and the second mode. However, different modes may be set in accordance with the size of the surrounding region, for example, the second mode for a small surrounding region, and a third mode for a large surrounding region. In other words, the acquisition mode determination unit 308 determines a mode among a plurality of modes including the first mode and the second mode.

When the acquisition mode is determined to be the first mode (mode for communicating image data of the region of interest), the segment to be acquired-determination unit 305 determines in S403 that the region of interest is a region to be acquired. On the other hand, when the acquisition mode is determined to be the second mode (mode for communicating image data of the region of no interest in addition to the image data of the region of interest), the segment to be acquired-determination unit 305 determines in S404 that the region of interest and the region of no interest (surrounding region) are a region to be acquired.

The size of the region of no interest (surrounding region) may be fixed, or the surrounding region may be determined such that the size thereof may be varied. In other words, the segment to be acquired-determination unit 305 can determine the range of the region of no interest communicated in the second mode based on at least any of a user instruction, communication status in the network 103, and load status of the receiving apparatus 102. More specifically, in a case where a round trip time (RTT) is equal to or greater than a threshold value, or where a packet error rate is equal to or greater than a threshold value, the segment to be acquired-determination unit 305 can determine the surrounding region to be smaller than that in a case where the RTT or the packet error rate is not equal to or greater than a threshold value. In another specific example, in a case where load status of the decoding unit 302 of the receiving apparatus 102 is equal to or greater than a threshold value, the segment to be acquired-determination unit 305 can determine the surrounding region to be smaller than that in a case where the load status is not equal to or greater than a threshold value. When the range of the region of no interest (surrounding region) to be communicated is made to be variable as described above, there is an effect that the receiving apparatus 102 can acquire as wide range as possible of image data to the extent that the receiving apparatus 102 can receive and decode the image data.

In S405, the segment to be acquired-determination unit 305 determines acquisition timing of the segment determined in S403 or S404. In the embodiment, timing for transmitting a request for image data to the transmitting apparatus 101 is determined based on a reproduction time corresponding to image data which has not been reproduced (displayed) in the display controller 301 among the image data received from the transmitting apparatus 101. For example, the segment to be acquired-determination unit 305 determines, as transmission timing of a segment acquisition request, timing when a reproduction time, corresponding to image data which has not been reproduced among the received image data, becomes less than two seconds. However, the timing is not limited to the above example, and timing when the acquisition mode has been switched by a user operation and the like may be determined as timing for acquiring the segment.

In S406, the segment to be acquired-determination unit 305 determines whether it is transmission timing of the acquisition request determined in S405. When it has been determined not to be the transmission timing of the acquisition request, the segment to be acquired-determination unit 305 repeats the determination in S406 until it is determined to be the transmission timing of the acquisition request. However, when it has been determined to be "NO" in S406 the predetermined number of times or more, the processing illustrated in FIG. 4 may be ended.

When it has been determined in S406 to be the transmission timing of the acquisition request, the communication module 306 transmits in S407 a new segment acquisition request to the transmitting apparatus 101. In the embodiment, the new segment acquisition request is realized by access to the transmitting apparatus 101 based on HTTP. In parallel with the processing illustrated in FIG. 4, reception, analysis, decoding, and display processing of the image data are performed. In other words, the communication module 306 receives a segment transmitted from the transmitting apparatus 101 in response to the new segment acquisition request, the segment analysis unit 303 extracts image data through the analysis of the segment, the decoding unit 302 decodes the image data. Then the display controller 301 performs control such that a display unit displays an image based on the image data decoded by the decoding unit 302.

When the processing in S407 has been ended, the step moves to S408, and the segment to be acquired-determination unit 305 determines whether the processing illustrated in FIG. 4 is continued or ended. When the processing has been determined to be continued, the step returns to S401 and the processing is continued. When the processing has been determined to be ended, the processing illustrated in FIG. 4 is ended.

As described above, the receiving apparatus 102 according to the embodiment switches between reception of image data of the region of interest and reception of image data of a surrounding region in addition to the image data of the region of interest in accordance with the transition mode. By doing so, image data can be communicated in accordance with the network 103, load status of the receiving apparatus 102, and a viewing state of a user. In particular, in a case where image data of the surrounding region is transmitted in addition to the image data of the region of interest, for example, even when a user of the receiving apparatus 102 who displays an image of the region of interest changes a region to be displayed by a swipe operation or the like, an image of the changed region can be displayed quickly.

Figure 5:
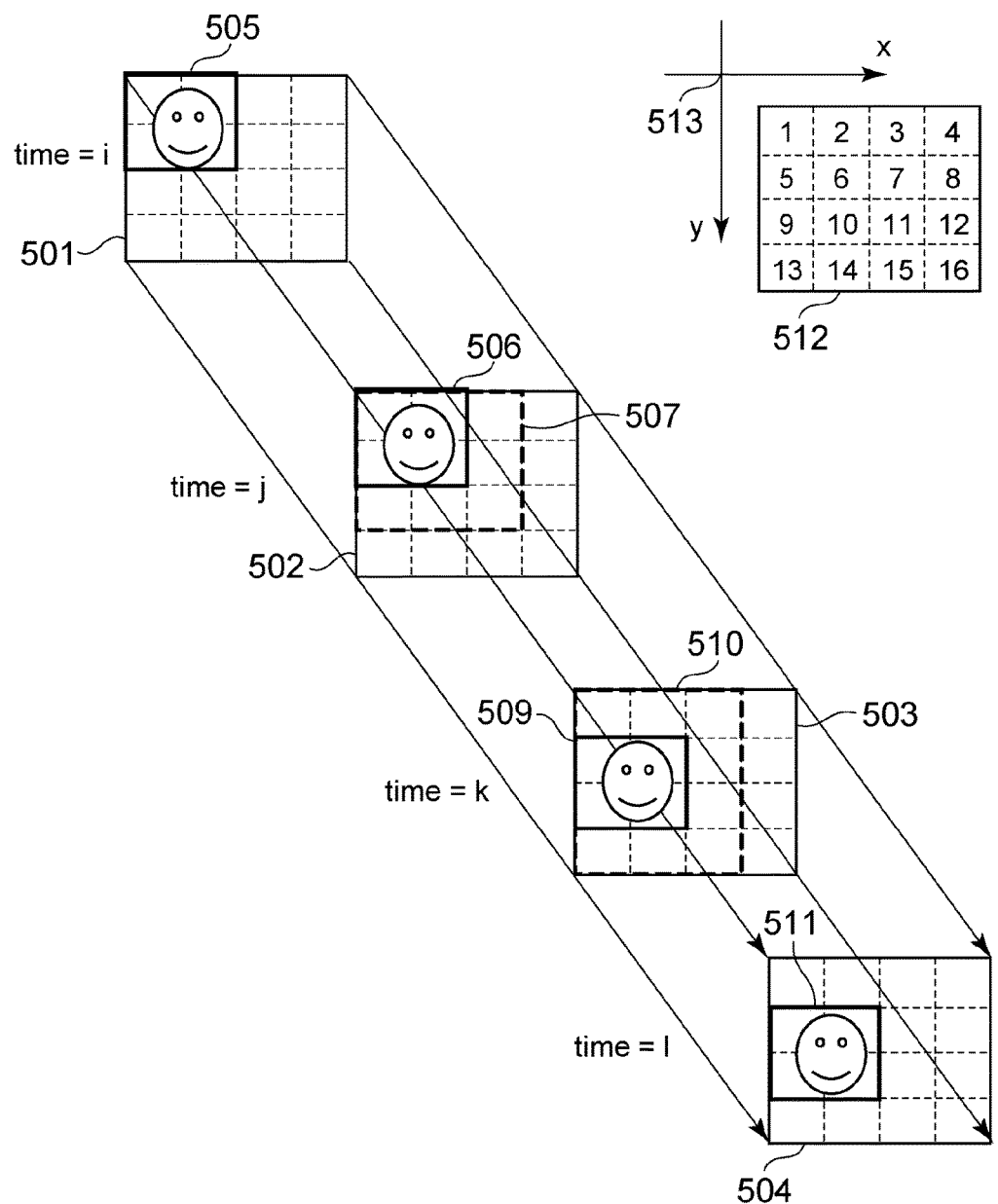
FIG. 5 is a diagram illustrating an example of a segment to be acquired in the embodiment.

FIG. 5 is a diagram for explaining a relationship among an overall region, a region of interest (ROI), and a surrounding region (region of no interest) in the embodiment. In the embodiment, a description will be given for a case where a part of the region of interest as denoted by reference numeral 505 is acquired from video regions generated by dividing the overall region 512 into 16 parts. The number of divided video regions is not limited to 16.

501 to 504 denote images arranged in a time-series order. Each of 501 to 504 corresponds to an overall region at a certain time point. In 501, the region of interest is a region enclosed by a thick solid line (tile Nos. 1, 2, 5, and 6), which is 505. When an acquisition mode is a non-transition mode (first mode) at a time point i which corresponds to 501, a segment to be acquired determined by the segment to be acquired-determination unit 305 is a segment corresponding to tile Nos. 1, 2, 5, and 6.

In addition, it is assumed that the acquisition mode has been switched to a transition mode (second mode) by a time point j which corresponds to 502. In such a case, a segment to be acquired determined by the segment to be acquired-determination unit 305 is the region of interest enclosed by a thick solid line (tile Nos. 1, 2, 5, and 6), which is 506, and a surrounding region (tile Nos. 3, 7, 9, 10, and 11). Although FIG. 5 illustrates an example in which the surrounding region is tiles adjacent to the region of interest, the size of the surrounding region may be set and changed appropriately as described above. For example, when there is room in a bandwidth of the network 103, a tile located further outside the tile adjacent to the region of interest may be included in the surrounding region. The receiving apparatus 102 acquires segments of the region of interest and the surrounding region in the transition mode, decodes the acquired segments in the decoding unit 302, and can display only the region of interest in the display controller 301. In a case where a user has performed a transition (change) operation of the region of interest thereafter, when the position of the changed region of interest is within the surrounding region 507 enclosed by a dotted line, a displayed image can be seamlessly changed. The transition of the region of interest may be executed by a user instruction through a swipe operation from the user interface unit 307, or may be performed automatically while following movement of an object by using an object recognition technique and the like.

In addition, the transition (change) of the region of interest may be prevented from being executed until the surrounding region is prepared to be displayed. In other words, the display controller 301 of the receiving apparatus 102 displays an image corresponding to the region of interest, and when a user operation to change the region of interest is input, determines whether it is possible to display an image corresponding to the region of interest which has been changed in accordance with the user operation. When the display controller 301 has determined that it is possible to display the image of the changed region of interest, the display controller 301 changes the region of interest in accordance with the user operation, and when the display controller 301 has determined that it is difficult to display the image of the changed region of interest, the display controller 301 limits the change of the region of interest in accordance with the user operation. The display controller 301 can determine whether it is possible to display the image of the changed region of interest based on, for example, whether image data corresponding to the changed region of interest has been decoded by the decoding unit 302. By the above procedure, it is possible to prevent transition to the region which cannot be displayed.

However, the change of the region of interest may not be limited. In such a case, the display controller 301 changes the region of interest regardless of whether it is possible to display the image of the region of interest which has been changed in accordance with the user operation. When there is a region where an image cannot be displayed (undisplayable region) in the changed region of interest, the undisplayable region is displayed in a state where it is filled with black or the like. However, in accordance with the completion of decoding of image data of the undisplayable region, the image will be displayed.

At a time point k in 503, the region of interest is a region enclosed by a thick solid line (tile Nos. 5, 6, 9, and 10), which is 509, and the surrounding region is a region enclosed by a thick dotted line (tile Nos. 1, 2, 3, 7, 11, 13, 14, and 15). Regarding the timing when the surrounding region is switched from 507 to 510, timing when the bottom border of the region of interest 506 has reached an intermediate position between tile Nos. 9 and 10, and tile Nos. 13 and 14 can be employed. By doing so, the surrounding region can be expanded as 510 before the region of interest 506 deviates in a y-direction from the surrounding region 507, and thereby seamless transition can be realized.

It is assumed that the acquisition mode has been switched to a non-transition mode (first mode) from the transition mode (second mode) at a time point 1 in 504. In such a case, a segment to be acquired determined by the segment to be acquired-determination unit 305 is a region 511 enclosed by a thick solid line (tile Nos. 5, 6, 9, and 10) only, and the surrounding region is not included in the segment to be acquired. When the surrounding region is prevented from being acquired in the non-transition mode as described above, it is possible to efficiently use the bandwidth of the network 103 and resources of the transmitting apparatus 101 and the receiving apparatus 102.

The transmitting apparatus 101 of the embodiment may encode image data based on a scalable coding system. When image data is encoded according to the scalable coding system, image data having a plurality of hierarchies with different qualities of at least one of resolution, a frame rate, and an SNR, is generated. For example, the encoding unit 202 can generate image data having two hierarchies of a base layer and an enhancement layer by encoding, according to the scalable coding system, image data acquired by image capturing by the image capturing unit 201. However, the number of hierarchies is not limited to two, and it is possible to generate image data having a plurality of enhancement layers such as a plurality of enhancement layers 1 and 2.

The decoding unit 302 of the receiving apparatus 102 can decode only image data of the base layer received from the transmitting apparatus 101, and can decode image data of the base layer and image data of the enhancement layer received from the transmitting apparatus 101. In a case where the image data of the base layer and the image data of the enhancement layer have been decoded, quality of at least one of resolution, a frame rate, and an SNR of the decoded image is improved in comparison to the case where only the image data of the base layer has been decoded.

In the embodiment, a description will be focused on an example in which each of the base layer and the enhancement layer is constituted by the 16 divided regions such as those illustrated by 512 in FIG. 5, and image data of, among the above regions, a region of interest such as that illustrated by the region of interest 505 is communicated. However, there is no limitation to the above example.

When making an acquisition request for image data corresponding to a time point j in FIG. 5, the receiving apparatus 102 requests image data of the base layer and image data of the enhancement layer for image data of the region of interest 506 (tile Nos. 1, 2, 5, and 6). On the other hand, for image data of the surrounding region (tile Nos. 3, 7, 9, 10, and 11), the receiving apparatus 102 requests image data of the base layer only, and does not request image data of the enhancement layer.

In other words, in the transition mode (second mode), the transmitting apparatus 101 and the receiving apparatus 102 communicate image data encoded in such a way that a bit rate per tile of the image data of the region of interest is higher than that of the region of no interest (surrounding region). With the above configuration, image data can be displayed seamlessly in accordance with the change (transition) of the region of interest while reducing a load on the network 103 and the receiving apparatus 102 by suppressing traffic of the image data of the surrounding region which is not being displayed. When there is room for a state of the network 103 and load status of the receiving apparatus 102, the image data of the enhancement layer may be received for the image data of the surrounding region, as well. In addition, for a region closer to the region of interest in the surrounding region, the image data of the enhancement layer may be communicated, and for a region farther from the region of interest in the surrounding region, the image data of the base layer only may be communicated.

Although the above description has been focused on a case where the bit rate of image data of the region of interest and that of the surrounding region are made different from each other by performing encoding based on the scalable coding system, there is no limitation thereto. For example, the encoding unit 202 of the transmitting apparatus 101 can execute encoding with quantization parameters different between the region of interest and the surrounding region.

Although the description in the above embodiment has been focused on a case where the receiving apparatus 102 determines an acquisition mode and a segment to be requested, it is also possible for the transmitting apparatus 101 to perform the above processing. Hereinbelow, an embodiment will be described in which the transmitting apparatus 101 determines an acquisition mode, and determines a segment to be transmitted in accordance with a determination result of the acquisition mode.

Figure 6:
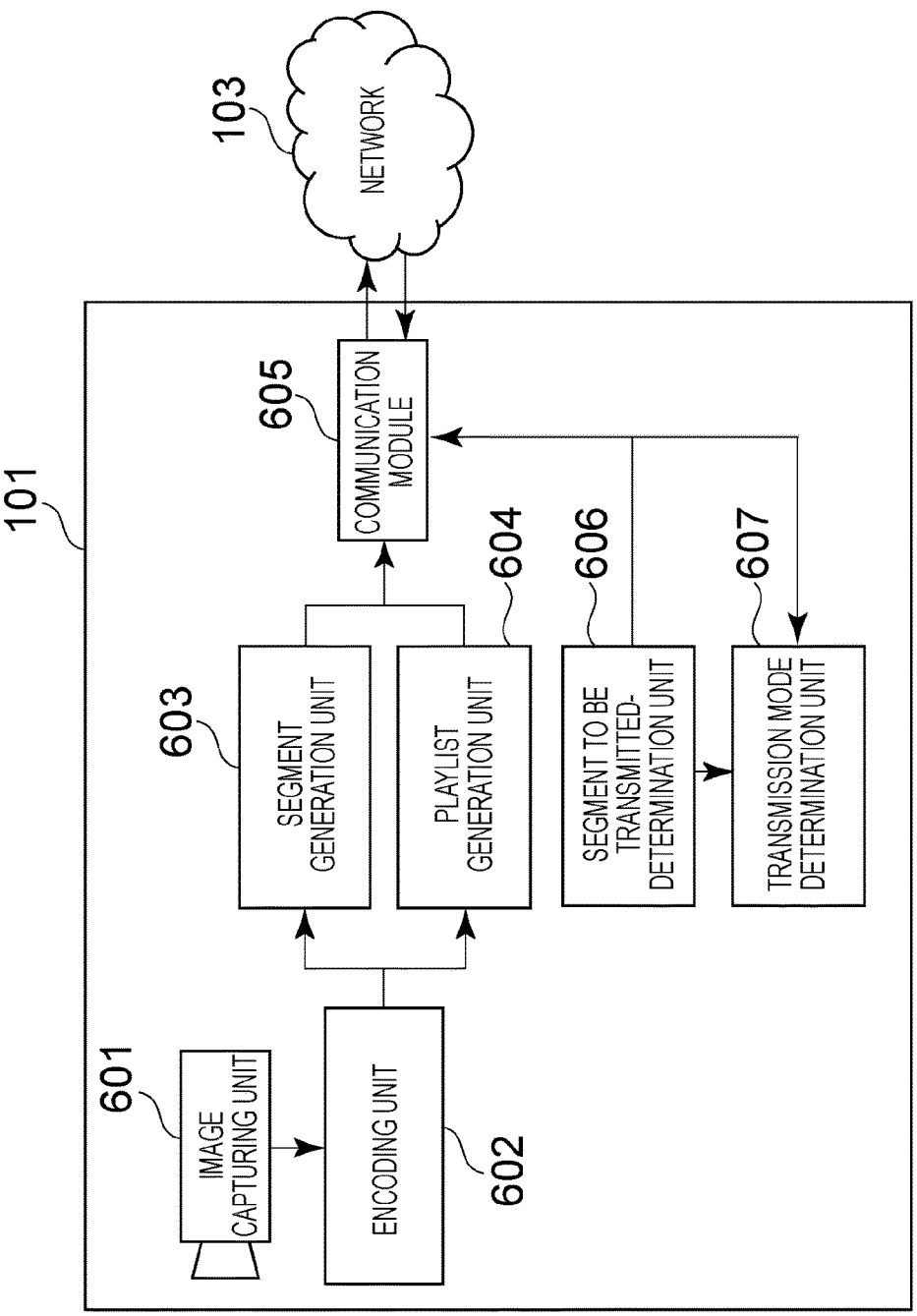
FIG. 6 is a block diagram illustrating an example of a functional configuration of a transmitting apparatus 101 in an embodiment.

FIG. 6 is a block diagram for explaining an example of a functional configuration of the transmitting apparatus 101 in a case where the transmitting apparatus 101 determines an acquisition mode and a segment to be transmitted.

Since configurations of 601 to 605 in FIG. 6 are the same as those of 201 to 205 in FIG. 2, a description thereof will be omitted. A transmission mode determination unit 607 determines whether a transmission mode is set to a non-transition mode (first mode) or a transition mode (second mode). As a method for determining a transmission mode, for example, a method can be used in which a communication module 605 acquires an acquisition mode of the receiving apparatus 102 through the network 103. Furthermore, there are other methods for determining a transmission mode. A method may be used in which the transmitting apparatus 101 measures communication status (bandwidth) of the network 103, and when there is room for the bandwidth, the transition mode is determined as the acquisition mode, and when there is not, the non-transition mode is determined as the acquisition mode. In addition, a method may be used in which the transmitting apparatus 101 is provided with a user interface, and a transmission mode is determined based on information input through the user interface.

When the transmission mode is the transition mode (second mode), a segment to be transmitted-determination unit 606 determines that image data (segment of the region of interest) requested from the receiving apparatus 102 and in addition thereto, image data of the surrounding region located around the region of interest are transmitted. On the other hand, when the transmission mode determined by a transmission mode determination unit 607 is the non-transition mode (first mode), the segment to be transmitted-determination unit 606 determines that only image data (segment of the region of interest) requested from the receiving apparatus 102 is transmitted.

The communication module 605 transmits, in response to the request from the receiving apparatus 102, a segment determined by the segment to be transmitted-determination unit 606 to be transmitted to the receiving apparatus 102 through the network 103 in accordance with a protocol, which is HTTP. In other words, the communication module 605 of the transmitting apparatus 101 transmits image data to other communication apparatus (receiving apparatus 102) based on the transmission mode determined by the transmission mode determination unit 607.

As a method for transmitting, by the communication module 605, a segment corresponding to the surrounding region, server push technology may be used. The server push technology is used for HTTP/2, WebSocket or other technology and is a system for transmitting data other than requested data to the receiving apparatus 102 from the transmitting apparatus 101.

However, the method for transmitting a segment of the surrounding region is not limited to those using the server push technology. For example, image data of the region of interest and image data of the surrounding region may be combined into one segment and transmitted from the transmitting apparatus 101 to the receiving apparatus 102.

An operation of the transmitting apparatus 101 illustrated in FIG. 6 will be described with the use of the flowchart illustrated in FIG. 4. The transmitting apparatus 101 according to the embodiment executes processing described with reference to FIG. 4 through the CPU 701 illustrated in FIG. 7 executing a necessary program. The processing illustrated in FIG. 4 is started at timing when an instruction to start an image streaming service has been input through the receiving apparatus 102. However, the timing for start the processing illustrated in FIG. 4 is not limited to the above timing.

In S401, the communication module 605 receives a segment acquisition request from the receiving apparatus 102. The segment to be transmitted-determination unit 606 specifies a region of interest in an overall image corresponding to the segment requested from the receiving apparatus 102 based on a URL included in the segment acquisition request.

In S402, the transmission mode determination unit 607 determines whether a transmission mode is set to a non-transition mode (first mode) or a transition mode (second mode). A method for determining a transmission mode is as described above. When the non-transition mode has been determined as the transmission mode, the segment to be transmitted-determination unit 606 determines in S403 that a segment corresponding to the region of interest is a segment to be transmitted. On the other hand, when the transition mode has been determined as the transmission mode, the segment to be transmitted-determination unit 606 determines in S404 that a segment corresponding to the region of interest and a segment corresponding to the surrounding region are segments to be transmitted. The processing of S405 and S406 can be omitted.

Then, in S407, the communication module 605 of the transmitting apparatus 101 transmits the segment determined as the segment to be transmitted in S403 or S404 to the receiving apparatus 102. The transmitting apparatus 101 determines in S408 whether the processing illustrated in FIG. 4 is continued or ended. When the processing has been determined to be continued, the step returns to S401 and the transmitting apparatus 101 is put into a state of waiting for an acquisition request from the receiving apparatus 102. On the other hand, when the processing has been determined in S408 to be ended, the processing illustrated in FIG. 4 is ended.

As described above, the transmitting apparatus 101 determines the transmission mode and determines whether image data of the region of interest is transmitted, or in addition to the image data of the region of interest, image data of the surrounding region is transmitted, based on a determination result of the transmission mode. Also with the above configuration, it is possible to realize image data communication in accordance with the network 103 and load status of the transmitting apparatus 101, a viewing state of a user, and the like. In particular, in a case where the image data of the surrounding region is transmitted in addition to the image data of the region of interest, even when a user of the receiving apparatus 102, who displays an image of the region of interest, changes a region to be displayed by a swipe operation or the like, an image of the changed region can be displayed quickly.

According to the configuration of the embodiment, it is possible to communicate image data corresponding to an image to be displayed on a display screen and to prevent image data of an unnecessary region from being communicated.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-138114, filed Jul. 9, 2015, which is hereby incorporated by reference herein in its entirety.

What is claimed is:

1. A communication apparatus, comprising:
an acquisition unit configured to acquire a playlist including a plurality of URLs for requesting image data corresponding to each of a plurality of divided regions of an image;
a specifying unit configured to specify a region of interest in the image;
a determination unit configured to determine a mode used for communication of image data from a plurality of modes including a first mode for communicating image data of one or more divided regions corresponding to the region of interest specified by the specifying unit, and a second mode for communicating, in addition to the image data of the one or more divided regions corresponding to the region of interest, image data of one or more divided regions corresponding to a region other than the region of interest; and
a communication unit configured to communicate with another communication apparatus,
wherein the communication unit requests, to said another communication apparatus:
the image data of the one or more divided regions corresponding to the region of interest based on one or more URLs that are corresponding to the region of interest and are included in the playlist, in a case where the determination unit has determined that the first mode is used for communication of the image data, and
both of (a) the image data of the one or more divided regions corresponding to the region of interest based on the one or more URLs that are corresponding to the region of interest and are included in the playlist and (b) the image data of the one or more divided regions corresponding to the region other than the region of interest based on one or more URLs that are corresponding to the region other than the region of interest and are included in the playlist, in a case where the determination unit has determined that the second mode is used for communication of the image data.

2. The communication apparatus according to claim 1, wherein the determination unit determines the mode based on at least any of a user instruction, communication status in a network connecting the communication apparatus to said another communication apparatus, and load status of the communication apparatus.

3. The communication apparatus according to claim 1, further comprising a region determination unit configured to determine a range of the region other than the region of interest communicated in the second mode based on at least any of a user instruction, communication status in a network connecting the communication apparatus to the other communication apparatus, and load status of the communication apparatus.

4. The communication apparatus according to claim 1, wherein image data, which is encoded in such a way that a bit rate of image data of the region of interest is higher than a bit rate of the region other than the region of interest, is transmitted in the second mode.

5. The communication apparatus according to claim 4, wherein the communication unit transmits image data of a base layer and image data of an enhancement layer encoded based on a scalable coding system as image data of the region of interest, and transmits image data of a base layer as image data of the region other than the region of interest.

6. The communication apparatus according to claim 1, further comprising a display control unit configured to display an image corresponding to the region of interest, wherein
when accepting a user operation to change the region of interest in the second mode, the display control unit executes processing to change the region of interest in accordance with the user operation, and when accepting a user operation to change the region of interest in the first mode, the display control unit does not execute processing to change the region of interest in accordance with the user operation.

7. The communication apparatus according to claim 1, further comprising a display control unit configured to display an image corresponding to the region of interest, wherein
when determining that it is possible to display an image corresponding to a region of interest which has been changed in accordance with a user operation to change the region of interest, the display control unit executes control to change the region of interest in accordance with the user operation, and when determining that it is impossible to display an image corresponding to a region of interest which has been changed in accordance with a user operation to change the region of interest, the display control unit limits the change to the region of interest in accordance with the user operation.

8. A communication method of a communication apparatus, comprising:

acquiring a playlist including a plurality of URLs for requesting image data corresponding to each of a plurality of divided regions of an image;

specifying a region of interest in the image;

determining a mode for communicating image data from a plurality of modes including a first mode for communicating image data of one or more divided regions corresponding to the region of interest specified, and a second mode for communicating, in addition to the image data of the one or more divided regions corresponding to the region of interest, image data of one or more divided regions corresponding to a region other than the region of interest; and communicating with another communication apparatus, wherein the communication apparatus requests, to said another communication apparatus:

the image data of the one or more divided regions corresponding to the region of interest based on one or more URLs that are corresponding to the region of interest and are included in the playlist, in a case where it is determined that the first mode is used for communication of the image data, and both of (a) the image data of the one or more divided regions corresponding to the region of interest based on the one or more URLs that are corresponding to the region of interest and are included in the playlist and (b) the image data of the one or more divided regions corresponding to the region other than the region of interest based on one or more URLs that are corresponding to the region other than the region of interest and are included in the playlist, in a case where it is determined that the second mode is used for communication of the image data.

9. The communication method according to claim 8, wherein, the mode is determined based on at least any of a user instruction, communication status in a network connecting the communication apparatus to said another communication apparatus, and load status of the communication apparatus.

10. The communication method according to claim 8, further comprising determining a range of the region other than the region of interest communicated in the second mode based on at least any of a user instruction, communication status in a network connecting the communication apparatus to the other communication apparatus, and load status of the communication apparatus.

11. A non-transitory computer-readable storage medium storing a program for causing a computer to execute a communication method of a communication apparatus, comprising:

acquiring a playlist including a plurality of URLs for requesting image data corresponding to each of a plurality of divided regions of an image;

specifying a region of interest in the image;

determining a mode used for communicating image data from a plurality of modes including a first mode for communicating image data of one or more divided regions corresponding to the region of interest specified, and a second mode for communicating, in addition to the image data of the one or more divided regions corresponding to the region of interest, image data of one or more divided regions corresponding to a region other than the region of interest; and communicating with another communication apparatus, wherein the communication apparatus requests, to said another communication apparatus:

the image data of the one or more divided regions corresponding to the region of interest based on one or more URLs that are corresponding to the region of interest and are included in the playlist, in a case where it is determined that the first mode is used for communication of the image data, and both of (a) the image data of the one or more divided regions corresponding to the region of interest based on the one or more URLs that are corresponding to the region of interest and are included in the playlist and (b) the image data of the one or more divided regions corresponding to the region other than the region of interest based on one or more URLs that are corresponding to the region other than the region of interest and are included in the playlist, in a case where it is determined that the second mode is used for communication of the image data.

12. A communication system including a communication apparatus connected to another communication apparatus, the communication apparatus comprising:

an acquisition unit configured to acquire a playlist including a plurality of URLs for requesting image data corresponding to each of a plurality of divided regions of an image;

a specifying unit configured to specify a region of interest in the image;

a determination unit configured to determine a mode used for communication of image data from a plurality of modes including a first mode for communicating image data of one or more divided regions corresponding to the region of interest specified by the specifying unit, and a second mode for communicating, in addition to the image data of the one or more divided regions corresponding to the region of interest, image data of one or more divided regions corresponding to a region other than the region of interest; and a communication unit configured to communicate with said another communication apparatus, wherein the communication unit requests, to said another communication apparatus:

the image data of the one or more divided regions corresponding to the region of interest based on one or more URLs that are corresponding to the region of interest and are included in the playlist, in a case where the determination unit has determined that the first mode is used for communication of the image data, and both of (a) the image data of the one or more divided regions corresponding to the region of interest based on the one or more URLs that are corresponding to the region of interest and are included in the playlist and (b) the image data of the one or more divided regions corresponding to the region other than the region of interest based on one or more URLs that are corresponding to the region other than the region of interest and are included in the playlist, in a case where the determination unit has determined that the second mode is used for communication of the image data.

\* \* \* \* \*